US008125101B1

(12) United States Patent
Jaworski et al.

(10) Patent No.: US 8,125,101 B1
(45) Date of Patent: Feb. 28, 2012

(54) DIGITALLY ENCODED VEHICLE LAMP SWITCH SYSTEM WITH FAULT TOLERANCE

(75) Inventors: David J. Jaworski, Bloomfield, MI (US); Mark Christian Aaron, Canton, MI (US); William E. Crafts, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/640,809

(22) Filed: Aug. 16, 2000

(51) Int. Cl.
*B60L 1/14* (2006.01)
(52) U.S. Cl. ..................... 307/10.8
(58) Field of Classification Search ............. 307/10.1, 307/9.1, 10.8, 140; 315/77
See application file for complete search history.

(56) References Cited

U.S. PATENT DOCUMENTS 3,903,429 A 9/1975 Heffel
(Continued)

*Primary Examiner* — Robert L. Deberadinis
(74) *Attorney, Agent, or Firm* — Tung & Associates; Jennifer M. Stec

(57) ABSTRACT

A digitally encoded vehicle lamp switch system provided that supplies signals for controlling the lighting functions of a vehicle. The lamp switch system includes a multi-position switch circuit having a plurality of contacts. The multi-position switch contacts selectively connect a plurality of circuit connections of a vehicle lamp control module microprocessor to ground or open circuit conditions to provide digitally encoded signals to the microprocessor to selectively illuminate the vehicle lamps.

8 Claims, 7 Drawing Sheets

U.S. PATENT DOCUMENTS

| | | | |
|---|---|---|---|
| 4,695,682 A * | 9/1987 | Winogrocki | 200/5 R |
| 5,185,558 A | 2/1993 | Benedict et al. | |
| 5,773,935 A | 6/1998 | Wagner et al. | |
| 5,822,166 A * | 10/1998 | Massie | 361/111 |

* cited by examiner

| Normal Switch Output | | | | | | | |
|---|---|---|---|---|---|---|---|
| | H/L Switch Position | | | Current State (0=ground, 1=open) | | | |
| States | H/L | FF | RF | M | A | B | C | D |
| 1 | Main | Off | Off | 0 | 0 | 0 | 1 | 1 |
| 2 | Main | On | Off | 0 | 0 | 0 | 0 | 1 |
| 3 | Main | On | On | 0 | 0 | 0 | 0 | 0 |
| 4 | Park | Off | Off | 1 | 0 | 1 | 1 | 1 |
| 5 | Park | On | Off | 1 | 0 | 1 | 0 | 1 |
| 6 | Park | On | On | 1 | 0 | 1 | 0 | 0 |
| 7 | Off | Off | Off | 1 | 1 | 1 | 1 | 1 |
| 8 | A1 | Off | Off | 1 | 1 | 0 | 1 | 1 |
| 9 | A1 | On | Off | 1 | 1 | 0 | 0 | 1 |
| 10 | A1 | On | On | 1 | 1 | 0 | 0 | 0 |
| 11 | A2 | Off | Off | 1 | 0 | 0 | 1 | 1 |
| 12 | A2 | On | Off | 1 | 0 | 0 | 0 | 1 |
| 13 | A2 | On | On | 1 | 0 | 0 | 0 | 0 |

FIG. 3

| Failure Mode Stategy: Short to Ground on M Circuit ||||||||||||||
| H/L Switch Position ||| Circuit State (0=ground, 1=open) ||||| Module Sees ||| Interpret As |||
| Switch | H/L | FF | RF | M(0) | A | B | C | D | H/L | FF | RF | H/L | FF | RF |
|---|---|---|---|---|---|---|---|---|---|---|---|---|---|---|
| 1 | Main | Off | Off | 0 | 0 | 0 | 1 | 1 | Main | Off | Off | Main | Off | Off |
| 2 | Main | On | Off | 0 | 0 | 0 | 0 | 1 | Main | On | Off | Main | On | Off |
| 3 | Main | On | On | 0 | 0 | 0 | 0 | 0 | Main | On | On | Main | On | On |
| 4 | Park | Off | Off | 0 | 0 | 1 | 1 | 1 | Main | Off | Off | Main | Off | Off |
| 5 | Park | On | Off | 0 | 0 | 1 | 0 | 1 | Main | On | Off | Main | On | Off |
| 6 | Park | On | On | 0 | 0 | 1 | 0 | 0 | Main | On | On | Main | On | On |
| 7 | Off | Off | Off | 0 | 1 | 1 | 1 | 1 | Main | Off | Off | Off | Off | Off |
| 8 | A1 | Off | Off | 0 | 1 | 0 | 1 | 1 | Main | Off | Off | Main | Off | Off |
| 9 | A1 | On | Off | 0 | 1 | 0 | 0 | 1 | Main | On | Off | Main | On | Off |
| 10 | A1 | On | On | 0 | 1 | 0 | 0 | 0 | Main | On | On | Main | On | On |
| 11 | A2 | Off | Off | 0 | 0 | 0 | 1 | 1 | Main | Off | Off | Main | Off | Off |
| 12 | A2 | On | Off | 0 | 0 | 0 | 0 | 1 | Main | On | Off | Main | On | Off |
| 13 | A2 | On | On | 0 | 0 | 0 | 0 | 0 | Main | On | On | Main | On | On |

| Failure Mode Stategy: Short to Ground on A Circuit ||||||||||||||
| H/L Switch Position ||| Circuit State (0=ground, 1=open) ||||| Module Sees ||| Interpret As |||
| Switch | H/L | FF | RF | M | A(0) | B | C | D | H/L | FF | RF | H/L | FF | RF |
|---|---|---|---|---|---|---|---|---|---|---|---|---|---|---|
| 1 | Main | Off | Off | 0 | 0 | 0 | 1 | 1 | Main | Off | Off | Main | Off | Off |
| 2 | Main | On | Off | 0 | 0 | 0 | 0 | 1 | Main | On | Off | Main | On | Off |
| 3 | Main | On | On | 0 | 0 | 0 | 0 | 0 | Main | On | On | Main | On | On |
| 4 | Park | Off | Off | 1 | 0 | 1 | 1 | 1 | Park | Off | Off | Park | Off | Off |
| 5 | Park | On | Off | 1 | 0 | 1 | 0 | 1 | Park | On | Off | Park | On | Off |
| 6 | Park | On | On | 1 | 0 | 1 | 0 | 0 | Park | On | On | Park | On | On |
| 7 | Off | Off | Off | 1 | 0 | 1 | 1 | 1 | Park | Off | Off | Park | Off | Off |
| 8 | A1 | Off | Off | 1 | 0 | 0 | 1 | 1 | A2 | Off | Off | A2 | Off | Off |
| 9 | A1 | On | Off | 1 | 0 | 0 | 0 | 1 | A2 | On | Off | A2 | On | Off |
| 10 | A1 | On | On | 1 | 0 | 0 | 0 | 0 | A2 | On | On | A2 | On | On |
| 11 | A2 | Off | Off | 1 | 0 | 0 | 1 | 1 | A2 | Off | Off | A2 | Off | Off |
| 12 | A2 | On | Off | 1 | 0 | 0 | 0 | 1 | A2 | On | Off | A2 | On | Off |
| 13 | A2 | On | On | 1 | 0 | 0 | 0 | 0 | A2 | On | On | A2 | On | On |

| Failure Mode Stategy: Short to Ground on B Circuit ||||||||||||||
| H/L Switch Position ||| Circuit State (0=ground, 1=open) ||||| Module Sees ||| Interpret As |||
| Switch | H/L | FF | RF | M | A | B(0) | C | D | H/L | FF | RF | H/L | FF | RF |
|---|---|---|---|---|---|---|---|---|---|---|---|---|---|---|
| 1 | Main | Off | Off | 0 | 0 | 0 | 1 | 1 | Main | Off | Off | Main | Off | Off |
| 2 | Main | On | Off | 0 | 0 | 0 | 0 | 1 | Main | On | Off | Main | On | Off |
| 3 | Main | On | On | 0 | 0 | 0 | 0 | 0 | Main | On | On | Main | On | On |
| 4 | Park | Off | Off | 1 | 0 | 0 | 1 | 1 | A2 | Off | Off | A2 | Off | Off |
| 5 | Park | On | Off | 1 | 0 | 0 | 0 | 1 | A2 | On | Off | A2 | On | Off |
| 6 | Park | On | On | 1 | 0 | 0 | 0 | 0 | A2 | On | On | A2 | On | On |
| 7 | Off | Off | Off | 1 | 1 | 0 | 1 | 1 | A1 | Off | Off | A1 | Off | Off |
| 8 | A1 | Off | Off | 1 | 1 | 0 | 1 | 1 | A1 | Off | Off | A1 | Off | Off |
| 9 | A1 | On | Off | 1 | 1 | 0 | 0 | 1 | A1 | On | Off | A1 | On | Off |
| 10 | A1 | On | On | 1 | 1 | 0 | 0 | 0 | A1 | On | On | A1 | On | On |
| 11 | A2 | Off | Off | 1 | 0 | 0 | 1 | 1 | A2 | Off | Off | A2 | Off | Off |
| 12 | A2 | On | Off | 1 | 0 | 0 | 0 | 1 | A2 | On | Off | A2 | On | Off |
| 13 | A2 | On | On | 1 | 0 | 0 | 0 | 0 | A2 | On | On | A2 | On | On |

FIG. 4A

| Failure Mode Stategy: Short to Ground on C Circuit | | | | | | | | | | | | | | |
|---|---|---|---|---|---|---|---|---|---|---|---|---|---|---|
| | H/L Switch Position | | | Circuit State (0=ground, 1=open) | | | | | Module Sees | | | Interpret As | | |
| Switch | H/L | FF | RF | M | A | B | C(0) | D | H/L | FF | RF | H/L | FF | RF |
| 1 | Main | Off | Off | 0 | 0 | 0 | 0 | 1 | Main | On | Off | Main | On | Off |
| 2 | Main | On | Off | 0 | 0 | 0 | 0 | 1 | Main | On | Off | Main | On | Off |
| 3 | Main | On | On | 0 | 0 | 0 | 0 | 0 | Main | On | On | Main | On | On |
| 4 | Park | Off | Off | 1 | 0 | 1 | 0 | 1 | Park | On | Off | Park | On | Off |
| 5 | Park | On | Off | 1 | 0 | 1 | 0 | 1 | Park | On | Off | Park | On | Off |
| 6 | Park | On | On | 1 | 0 | 1 | 0 | 0 | Park | On | On | Park | On | On |
| 7 | Off | Off | Off | 1 | 1 | 1 | 0 | 1 | Off | On | Off | Off | Off | Off |
| 8 | A1 | Off | Off | 1 | 1 | 0 | 0 | 1 | A1 | On | Off | A1 | On | Off |
| 9 | A1 | On | Off | 1 | 1 | 0 | 0 | 1 | A1 | On | Off | A1 | On | Off |
| 10 | A1 | On | On | 1 | 1 | 0 | 0 | 0 | A1 | On | On | A1 | On | On |
| 11 | A2 | Off | Off | 1 | 0 | 0 | 0 | 1 | A2 | On | Off | A2 | On | Off |
| 12 | A2 | On | Off | 1 | 0 | 0 | 0 | 1 | A2 | On | Off | A2 | On | Off |
| 13 | A2 | On | On | 1 | 0 | 0 | 0 | 0 | A2 | On | On | A2 | On | On |

| Failure Mode Stategy: Short to Ground on D Circuit | | | | | | | | | | | | | | |
|---|---|---|---|---|---|---|---|---|---|---|---|---|---|---|
| | H/L Switch Position | | | Circuit State (0=ground, 1=open) | | | | | Module Sees | | | Interpret As | | |
| Switch | H/L | FF | RF | M | A | B | C | D(0) | H/L | FF | RF | H/L | FF | RF |
| 1 | Main | Off | Off | 0 | 0 | 0 | 1 | 0 | Main | "1" | "1" | Main | Off | Off |
| 2 | Main | On | Off | 0 | 0 | 0 | 0 | 0 | Main | On | On | Main | On | On |
| 3 | Main | On | On | 0 | 0 | 0 | 0 | 0 | Main | On | On | Main | On | On |
| 4 | Park | Off | Off | 1 | 0 | 1 | 1 | 0 | Park | "1" | "1" | Park | Off | Off |
| 5 | Park | On | Off | 1 | 0 | 1 | 0 | 0 | Park | On | On | Park | On | On |
| 6 | Park | On | On | 1 | 0 | 1 | 0 | 0 | Park | On | On | Park | On | On |
| 7 | Off | Off | Off | 1 | 1 | 1 | 1 | 0 | Off | "1" | "1" | Off | Off | Off |
| 8 | A1 | Off | Off | 1 | 1 | 0 | 1 | 0 | A1 | "1" | "1" | A1 | Off | Off |
| 9 | A1 | On | Off | 1 | 1 | 0 | 0 | 0 | A1 | On | On | A1 | On | On |
| 10 | A1 | On | On | 1 | 1 | 0 | 0 | 0 | A1 | On | On | A1 | On | On |
| 11 | A2 | Off | Off | 1 | 0 | 0 | 1 | 0 | A2 | "1" | "1" | A2 | Off | Off |
| 12 | A2 | On | Off | 1 | 0 | 0 | 0 | 0 | A2 | On | On | A2 | On | On |
| 13 | A2 | On | On | 1 | 0 | 0 | 0 | 0 | A2 | On | On | A2 | On | On |

FIG.4B

| Failure Mode Stategy: Open Circuit on M Circuit ||||||||||||||
| H/L Switch Position ||| Circuit State (0=ground, 1=open) |||| Module Sees ||| Interpret As |||
| Switch | H/L | FF | RF | M(1) | A | B | C | D | H/L | FF | RF | H/L | FF | RF |
|---|---|---|---|---|---|---|---|---|---|---|---|---|---|---|
| 1 | Main | Off | Off | 1 | 0 | 0 | 1 | 1 | A2 | Off | Off | A2 | Off | Off |
| 2 | Main | On | Off | 1 | 0 | 0 | 0 | 1 | A2 | On | Off | A2 | On | Off |
| 3 | Main | On | On | 1 | 0 | 0 | 0 | 0 | A2 | On | On | A2 | On | On |
| 4 | Park | Off | Off | 1 | 0 | 1 | 1 | 1 | Park | Off | Off | Park | Off | Off |
| 5 | Park | On | Off | 1 | 0 | 1 | 0 | 1 | Park | On | Off | Park | On | Off |
| 6 | Park | On | On | 1 | 0 | 1 | 0 | 0 | Park | On | Off | Park | On | Off |
| 7 | Off | Off | Off | 1 | 1 | 1 | 1 | 1 | Off | Off | Off | Off | Off | Off |
| 8 | A1 | Off | Off | 1 | 1 | 0 | 1 | 1 | A1 | Off | Off | A1 | Off | Off |
| 9 | A1 | On | Off | 1 | 1 | 0 | 0 | 1 | A1 | On | Off | A1 | On | Off |
| 10 | A1 | On | On | 1 | 1 | 0 | 0 | 0 | A1 | On | On | A1 | On | On |
| 11 | A2 | Off | Off | 1 | 0 | 0 | 1 | 1 | A2 | Off | Off | A2 | Off | Off |
| 12 | A2 | On | Off | 1 | 0 | 0 | 0 | 1 | A2 | On | Off | A2 | On | Off |
| 13 | A2 | On | On | 1 | 0 | 0 | 0 | 0 | A2 | On | On | A2 | On | On |

| Failure Mode Stategy: Open Circuit on A Circuit ||||||||||||||
| H/L Switch Position ||| Circuit State (0=ground, 1=open) |||| Module Sees ||| Interpret As |||
| Switch | H/L | FF | RF | M | A(1) | B | C | D | H/L | FF | RF | H/L | FF | RF |
|---|---|---|---|---|---|---|---|---|---|---|---|---|---|---|
| 1 | Main | Off | Off | 0 | 1 | 0 | 1 | 1 | Main | Off | Off | Main | Off | Off |
| 2 | Main | On | Off | 0 | 1 | 0 | 0 | 1 | Main | On | Off | Main | On | Off |
| 3 | Main | On | On | 0 | 1 | 0 | 0 | 0 | Main | On | On | Main | On | On |
| 4 | Park | Off | Off | 1 | 1 | 1 | 1 | 1 | Off | Off | Off | Off | Off | Off |
| 5 | Park | On | Off | 1 | 1 | 1 | 0 | 1 | Off | On | Off | Off | On | Off |
| 6 | Park | On | On | 1 | 1 | 1 | 0 | 0 | Off | On | Off | Off | On | Off |
| 7 | Off | Off | Off | 1 | 1 | 1 | 1 | 1 | Off | Off | Off | Off | Off | Off |
| 8 | A1 | Off | Off | 1 | 1 | 0 | 1 | 1 | A1 | Off | Off | A1 | Off | Off |
| 9 | A1 | On | Off | 1 | 1 | 0 | 0 | 1 | A1 | On | Off | A1 | On | Off |
| 10 | A1 | On | On | 1 | 1 | 0 | 0 | 0 | A1 | On | On | A1 | On | On |
| 11 | A2 | Off | Off | 1 | 1 | 0 | 1 | 1 | A1 | Off | Off | A1 | Off | Off |
| 12 | A2 | On | Off | 1 | 1 | 0 | 0 | 1 | A1 | On | Off | A1 | On | Off |
| 13 | A2 | On | On | 1 | 1 | 0 | 0 | 0 | A1 | On | On | A1 | On | On |

| Failure Mode Stategy: Open Circuit on B Circuit ||||||||||||||
| H/L Switch Position ||| Circuit State (0=ground, 1=open) |||| Module Sees ||| Interpret As |||
| Switch | H/L | FF | RF | M | A | B(1) | C | D | H/L | FF | RF | H/L | FF | RF |
|---|---|---|---|---|---|---|---|---|---|---|---|---|---|---|
| 1 | Main | Off | Off | 0 | 0 | 1 | 1 | 1 | Main | Off | Off | Main | Off | Off |
| 2 | Main | On | Off | 0 | 0 | 1 | 0 | 1 | Main | On | Off | Main | On | Off |
| 3 | Main | On | On | 0 | 0 | 1 | 0 | 0 | Main | On | On | Main | On | On |
| 4 | Park | Off | Off | 1 | 0 | 1 | 1 | 1 | Park | Off | Off | Park | Off | Off |
| 5 | Park | On | Off | 1 | 0 | 1 | 0 | 1 | Park | On | Off | Park | On | Off |
| 6 | Park | On | On | 1 | 0 | 1 | 0 | 0 | Park | On | Off | Park | On | Off |
| 7 | Off | Off | Off | 1 | 1 | 1 | 1 | 1 | Off | Off | Off | Off | Off | Off |
| 8 | A1 | Off | Off | 1 | 1 | 1 | 1 | 1 | Off | Off | Off | Off | Off | Off |
| 9 | A1 | On | Off | 1 | 1 | 1 | 0 | 1 | Off | On | Off | Off | On | Off |
| 10 | A1 | On | On | 1 | 1 | 1 | 0 | 0 | Off | On | On | Off | On | On |
| 11 | A2 | Off | Off | 1 | 0 | 1 | 1 | 1 | Park | Off | Off | Park | Off | Off |
| 12 | A2 | On | Off | 1 | 0 | 1 | 0 | 1 | Park | On | Off | Park | On | Off |
| 13 | A2 | On | On | 1 | 0 | 1 | 0 | 0 | Park | On | On | Park | On | On |

FIG. 4C

| Failure Mode Stategy: Open Circuit on C Circuit |||||||||||||||
| H/L Switch Position ||| Circuit State (0=ground, 1=open) ||||| Module Sees ||| Interpret As |||
| Switch | H/L | FF | RF | M | A | B | C(1) | D | H/L | FF | RF | H/L | FF | RF |
|---|---|---|---|---|---|---|---|---|---|---|---|---|---|---|
| 1 | Main | Off | Off | 0 | 0 | 0 | 1 | 1 | Main | Off | Off | Main | Off | Off |
| 2 | Main | On | Off | 0 | 0 | 0 | 1 | 1 | Main | Off | Off | Main | Off | Off |
| 3 | Main | On | On | 0 | 0 | 0 | 1 | 0 | Main | "1" | "1" | Main | Off | Off |
| 4 | Park | Off | Off | 1 | 0 | 1 | 1 | 1 | Park | Off | Off | Park | Off | Off |
| 5 | Park | On | Off | 1 | 0 | 1 | 1 | 1 | Park | Off | Off | Park | Off | Off |
| 6 | Park | On | On | 1 | 0 | 1 | 1 | 0 | Park | "1" | "1" | Park | Off | Off |
| 7 | Off | Off | Off | 1 | 1 | 1 | 1 | 1 | Off | Off | Off | Off | Off | Off |
| 8 | A1 | Off | Off | 1 | 1 | 0 | 1 | 1 | A1 | Off | Off | A1 | Off | Off |
| 9 | A1 | On | Off | 1 | 1 | 0 | 1 | 1 | A1 | Off | Off | A1 | Off | Off |
| 10 | A1 | On | On | 1 | 1 | 0 | 1 | 0 | A1 | "1" | "1" | A1 | Off | Off |
| 11 | A2 | Off | Off | 1 | 0 | 0 | 1 | 1 | A2 | Off | Off | A2 | Off | Off |
| 12 | A2 | On | Off | 1 | 0 | 0 | 1 | 1 | A2 | Off | Off | A2 | Off | Off |
| 13 | A2 | On | On | 1 | 0 | 0 | 1 | 0 | A2 | "1" | "1" | A2 | Off | Off |

| Failure Mode Stategy: Open Circuit on D Circuit |||||||||||||||
| H/L Switch Position ||| Circuit State (0=ground, 1=open) ||||| Module Sees ||| Interpret As |||
| Switch | H/L | FF | RF | M | A | B | C | D(1) | H/L | FF | RF | H/L | FF | RF |
|---|---|---|---|---|---|---|---|---|---|---|---|---|---|---|
| 1 | Main | Off | Off | 0 | 0 | 0 | 1 | 1 | Main | Off | Off | Main | Off | Off |
| 2 | Main | On | Off | 0 | 0 | 0 | 0 | 1 | Main | On | Off | Main | On | Off |
| 3 | Main | On | On | 0 | 0 | 0 | 0 | 1 | Main | On | Off | Main | On | Off |
| 4 | Park | Off | Off | 1 | 0 | 1 | 1 | 1 | Park | Off | Off | Park | Off | Off |
| 5 | Park | On | Off | 1 | 0 | 1 | 0 | 1 | Park | On | Off | Park | On | Off |
| 6 | Park | On | On | 1 | 0 | 1 | 0 | 1 | Park | On | Off | Park | On | Off |
| 7 | Off | Off | Off | 1 | 1 | 1 | 1 | 1 | Off | Off | Off | Off | Off | Off |
| 8 | A1 | Off | Off | 1 | 1 | 0 | 1 | 1 | A1 | Off | Off | A1 | Off | Off |
| 9 | A1 | On | Off | 1 | 1 | 0 | 0 | 1 | A1 | On | Off | A1 | On | Off |
| 10 | A1 | On | On | 1 | 1 | 0 | 0 | 1 | A1 | On | Off | A1 | On | Off |
| 11 | A2 | Off | Off | 1 | 0 | 0 | 1 | 1 | A2 | Off | Off | A2 | Off | Off |
| 12 | A2 | On | Off | 1 | 0 | 0 | 0 | 1 | A2 | On | Off | A2 | On | Off |
| 13 | A2 | On | On | 1 | 0 | 0 | 0 | 1 | A2 | On | Off | A2 | On | Off |

FIG. 4D

DIGITALLY ENCODED VEHICLE LAMP SWITCH SYSTEM WITH FAULT TOLERANCE

BACKGROUND OF THE INVENTION

1. Field of the Invention

The present invention relates to lighting systems for vehicles, and more particularly to an automobile lighting system having a digitally encoded headlamp switch.

2. Background Art

Switching systems for vehicle headlamps are known wherein a main rotary switch is employed to produce control signals to operate load switches.

SUMMARY OF THE INVENTION

A digitally encoded vehicle lamp switch system is provided that supplies signals for controlling the lighting functions of a vehicle. The lamp switch system includes a multi-position switch circuit having a plurality of contacts. The multi-position switch contacts selectively connect a plurality of circuit connections of a vehicle lamp control module microprocessor to ground or open circuit states to provide digitally encoded signals to the microprocessor to selectively illuminate the vehicle lamps.

BRIEF DESCRIPTION OF THE DRAWINGS

The above set forth and other features of the invention are made more apparent in the ensuing Detailed Description of the Invention when read in conjunction with the attached drawings, wherein:

FIG. 3 is an illustration of a Normal Switch Output Table used in describing the present invention.

FIGS. 4A-D are an illustration of a Fault Logic Chart Table used in describing the present invention.

DETAILED DESCRIPTION OF THE INVENTION

Figure 1:
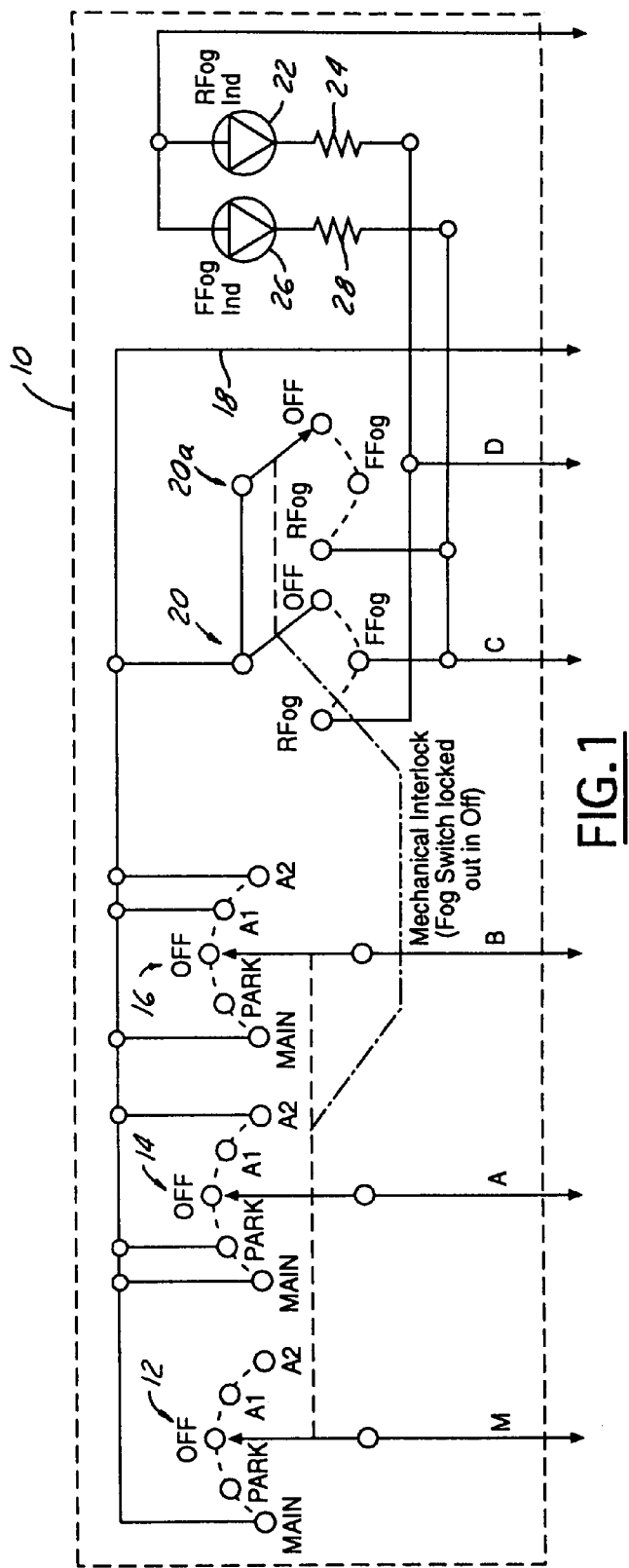
FIG. 1 is a schematic circuit diagram of an embodiment of a multi-position vehicle lamp and lighting switch circuit according to the principles of the present invention.

Referring to FIG. 1, an embodiment of the digitally encoded headlamp switch system of the present invention is shown that includes a multi-position switch for encoding digital signals that provide lighting functions for the high/low beams of a vehicle's main headlamps, the parking lamps, the front fog lamps, the rear fog lamps, and autolamp with two delay-timed settings. The autolamp functions to turn on the headlights based on ambient light levels. Each delay-timed setting results in a time period during which the headlamps remain illuminated after the ignition has been turned off to provide light for an activity such as entry into a house, for example.

The elements FFogInd and RFogInd are LED indicators that illuminate when the front fog lamps or rear fog lamps are on.

The ignition switch inputs are not shown in FIG. 1 because these elements are not unique to the invention and are known the those skilled in the art.

In the invention, digital code signals are produced on lines M, A, B, C and D by a multi-position switch circuit. The digital code signals on lines M, A, B, C and D correspond to the function provided by the settings of the multi-position switch.

Referring to FIG. 3, a Normal Switch Output Table is illustrated wherein a "0" indicates a grounded line and a "1" indicates an open line. "H/L" indicates headlamps, "FF" indicates front fog lamps, "RF" indicates rear fog lamps. "A1" indicates delay-timed setting number 1 and "A2" indicates delay timed setting number 2. "Main' refers to main lamps having high an low beams that are controlled by the multi-function switch. "Park" refers to parking lamps, "Off" designates lamps that are off. There is only one moving contact in the switch, but it makes both the front and rear outputs when in the rear fog position. In FIG. 3, numbers 1 through 13 identify the functional digitally encoded switch states.

The Fault Logic Chart Tables illustrated in FIG. 4 show the failure mode robustness, that is, the fault tolerance, resulting from the shorted or open lines M, A, B, C, D. The actual function desired is shown as "Headlamp Switch Position." The failure mode wherein a line is permanently shorted or open, is shown as "Circuit State." "Module Sees" shows the resulting digital code from the digital headlamp switch that has the failure. "Module Sees" shows the resulting digital code from the digital headlamp switch that has the failure. "Interpret As' shows the resulting function that has the failure, which includes decode software to default to an even more desirable function for the certain severe failure mode conditions. Shaded blocks in the "Module Sees" column highlight areas where the resulting function that has the failure is different from the intended function. Shaded blocks in the "Interpret As" columns highlight functions where decode software is compensating for and improving upon the "Module Sees" failure mode condition. The result is an operation shown in the "Interpret As" column that provides the best lighting function alternative that most closely resembles the lighting function selected by the user via the digital headlamp switch.

Additional failure mode robustness, that is, fault tolerance, is designed into the subsystem for high beams and for flash-to-pass (FTP) operation as shown in FIG. 4. Activation of the high beams is independent of the lighting control electronics. If a microprocessor failure in the system control module occurs with the lighting control electronics, high beams are nevertheless activated via the high beam relay. Flash-to-pass (FTP) redundancy occurs in that, if the digital headlamp switch and/or the lighting control electronics fail, FTP operation of high and low beams can still be activated via the multi-function switch. FTP operation is independent from both the lighting control electronics and the digital headlamp switch.

Referring to FIG. 1, a schematic illustration of a multi-position switch circuit 10 is shown including multi-position main and park light switches 12, 14 and 16 that are ganged together and each having five switch positions; Main, Park, Off, A1 and A2 wherein A1 indicates a delay-timed setting 1 and A2 indicates a delay-timed setting 2.

In the first switch (Main) position, the three switches 12, 14, and 16 respectively connect leads M, A and B to ground 18. In the second (Park) switch position, only the second switch 14 connects lead A to ground 18 while leads M and B are open circuited. In the third (Off) switch position, leads M, A and B are connected to Off and are open circuited. In the fourth (A1) switch position only the third switch 16 connects lead B to ground 18 and leads M and A are open circuited. In the fifth (A2) switch position, the second switch 14 connects lead A to ground 18 and the third switch 16 connects lead B to bus 16 and lead M is open circuited.

The three position Fog switches 20 and 20a having contacts RFog, FFog and Off and are connected to ground 18. In the first position of switch 20 (RFog), ground 18 is connected to a rear fog (RFog) indicator lamp 22 through resistor 24 and lead D is also connected to ground 18. In the second switch position of (FFog) of switches 20, ground 18 is connected to a front fog (FFog) indicator lamp 26 through resistor 28, and lead C is also connected to ground 18. In the third switch position of switch 20, ground 18 is connected to Off and RFog indicator 22, FFog indicator 26, lead C and lead D are open circuited. Switch 20a operates in a similar manner. There is a mechanical interlock between the main and park switches 12, 14, 16 and fog switches 20 and 20a such that the fog switches 20 and 20a are locked out in the Off position.

In the present embodiment, an open circuit line condition is a digital "1" and a grounded line condition is a "0". Thus, in the first switch position (Main) lines M, A and B are connected to ground and lines C and D are open circuited, providing a 00011 condition on leads M,A,B,C and D. In the second switch position (Park) lines M and B are open circuited and line A is grounded, lines C and D are open circuited, providing a 10111.

Referring to FIG. 3, the Normal Switch Output Table lists the thirteen switch states and the resultant digital signals produced on lines M,A,B, C and D.

Figure 2:
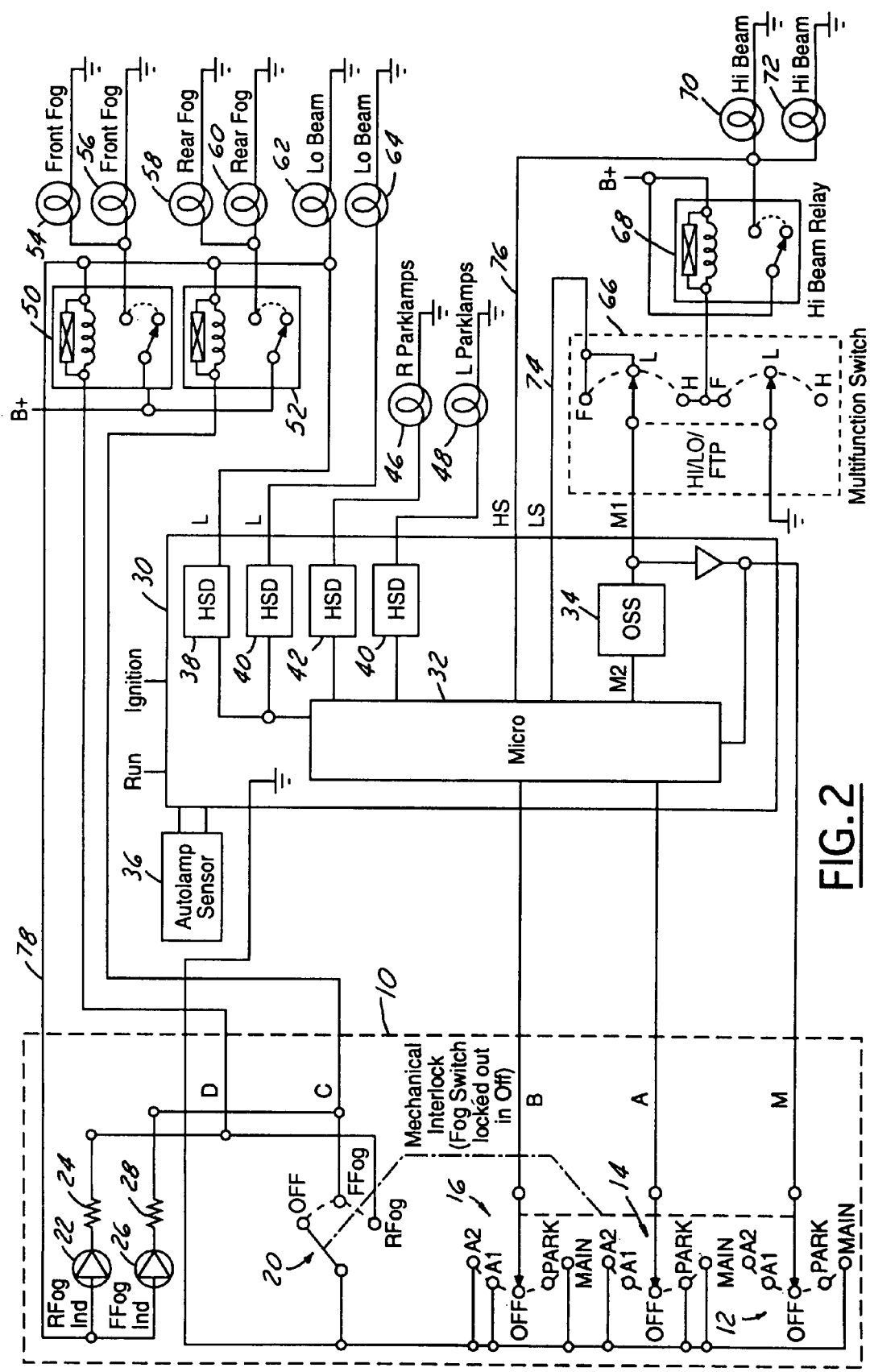
FIG. 2 is an embodiment of a digital vehicle lamp and lighting system incorporating the multi-position lighting switch circuit of FIG. 1 according to the principles of the present invention.

Referring to FIG. 2, a digitally encoded vehicle lamp and lighting switch system is illustrated incorporating the multi-position switch circuit 10 of FIG. 1. The M, A and B lines are connected to a control module block 30 containing a microprocessor 32, a relay driver 34, and an autolamp sensor 36. Microprocessor 32 is connected to Left Lo Beam High Side Driver 38, Right Lo Beam High Side Driver 40. Left Park Lamp High Side Driver 42, and Right Park Lamp High Side Driver 44 are connected to low beam lamp 62, high beam lamp 64, right parking lamps 46 and left parking lamps 48. Microprocessor 32 and Relay Driver 34 are connected to Multifunction-Dimmer Switch 66 on leads 74 and 76. Multifunction-Dimmer switch is a vehicle operator interface control that allows the vehicle operator to select Lo, Hi, or FTP features. The output from Multifunction-Dimmer Switch 66 is connected to actuate high beam relay 68 which in turn is connected along with the signal on lead 76 to actuate high beam lamps 70 and 72. The C and D lines and line 78 from the FFog ind and RFOG ind lamps 22 and 26 are connected to Front Fog Lamp Relay 50 and Rear Fog Lamp Relay 52. Front Fog Lamp Relay 50 is connected to Left Front Fog Lamps 54 and 56 and Rear Fog Lamp Relay 52 is connected to Rear Fog Lamps 58 and 60. The signal on lead 78 provides power to the FFogInd 26 and RFogInd 22 when the low beams are activated.

Referring to FIG. 3, the Normal Switch Output Table illustrates thirteen states and the corresponding High/Low Switch positions and the digital circuit state that result wherein a digital 0 is created by connection to ground and a digital 1 is created by an open switch condition. Using the Normal Switch Output Table of FIG. 3, it is seen how the multi-position switch positions that connect the control module 30 of FIG. 2 to ground or open circuit conditions generate a digital code that operates the plurality of lamps designated in FIG. 3.

The plurality of switch states for the ten specified failure mode strategies set forth in the Fault Logic Chart of FIGS. 4A-D are self-explanatory and categorizes all the conditions and states for the embodiment of the present invention illustrated in FIG. 2.

While the invention has been described in connection with a preferred embodiment, it is not intended to limit the scope of the invention to the particular form set forth, but, on the contrary, it is intended to cover such alternatives, modifications, and equivalences as may be included within the spirit and scope of the invention as described in the appended claims.

What is claimed is:

1. A digitally encoded switch system for operating a plurality of vehicle lamps comprising:
    a plurality of vehicle lamps;
    a multi-position switch circuit having a plurality of selectable switch positions, the multi-position switch circuit being connected to a voltage source and including a plurality of switch contacts for selectively connecting given ones of the switch contacts to the voltage source for creating different open and closed circuit conditions for corresponding positions of the multi-position switch circuit;
    a control module including a microprocessor connected to the multi-position switch circuit and to the plurality of vehicle lamps for illuminating selected ones of the vehicle lamps in accordance with the open and closed circuit conditions created by the multi-position switch circuit.

2. The digitally encoded switch system of claim 1 in which the switch contacts of the multi-position switch circuit provide digitally coded signals wherein an open circuit condition manifests a first binary state and a closed circuit condition manifests a second binary state, and wherein the control module microprocessor is responsive to the digitally coded signals manifested by the circuit conditions of the multi-position switch circuit to illuminate selected ones of the vehicle lamps in accordance with the digital code; and
    wherein the digitally encoded switch system includes failure mode robustness via decode software that that interprets circuit state failure modes when a line is permanently shorted or open and provides a best lighting function alternative that most closely resembles a lighting function selected by the user.

3. The digitally encoded switch system of claim 2, wherein the plurality of vehicle lamps include a left low beam headlamp and a left high beam headlamp, a right low beam headlamp and a right high beam headlamp, a left front fog lamp, a right front fog lamp, a left rear fog lamp, a right rear fog lamp, a left park lamp, and a right park lamp.

4. The digitally encoded switch system of claim 2, wherein a relay driver circuit, a multifunction switch and a relay are connected between the microprocessor and left and right high beam headlamp to selectively illuminate the headlamps in accordance with output signals from the microprocessor.

5. The digitally encoded switch system of claim 4, wherein the multi function switch can selectively illuminate the headlamps independent high beams or flash to pass (ftp) independent of a microprocessor failure.

6. The digitally encoded switch system of claim 2, wherein a left low beam high side driver circuit and a right low beam high side driver circuit are connected between the microprocessor and the left low beam headlamp and right low beam headlamp respectively to selectively illuminate the headlamps in accordance with output signals from the microprocessor.

7. The digitally encoded switch system of claim 2, wherein a front fog lamp relay and a rear fog lamp relay are connected between the multi-position switch circuit and the left front, right front, and left rear, right rear fog lamps respectively to selectively illuminate the fog lamps in accordance with output signals from the microprocessor.

8. The digitally encoded switch system of claim 2, further comprising:
    an autolamp sensor device connected to the control module to provide ambient light information to the control module.

* * * * *